US008732737B1

United States Patent
Kalmes et al.

(10) Patent No.: US 8,732,737 B1
(45) Date of Patent: May 20, 2014

(54) GEOGRAPHIC CONTEXT WEIGHTED CONTENT RECOMMENDATION

(71) Applicant: MobiTV, Inc., Oakland, CA (US)

(72) Inventors: Chad Kalmes, Lafayette, CA (US); Mark Jacobson, San Francisco, CA (US); Tim Lynch, San Anselmo, CA (US)

(73) Assignee: MobiTV, Inc., Emeryville, CA (US)

( * ) Notice: Subject to any disclaimer, the term of this patent is extended or adjusted under 35 U.S.C. 154(b) by 5 days.

(21) Appl. No.: 13/749,915

(22) Filed: Jan. 25, 2013

(51) Int. Cl.
| | |
|---|---|
| H04N 7/16 | (2011.01) |
| H04H 60/32 | (2008.01) |
| H04N 7/10 | (2006.01) |
| H04N 7/025 | (2006.01) |
| G06F 3/00 | (2006.01) |
| G06F 13/00 | (2006.01) |
| H04N 5/445 | (2011.01) |

(52) U.S. Cl.
USPC .................................. 725/14; 725/34; 725/46

(58) Field of Classification Search
None
See application file for complete search history.

(56) References Cited

U.S. PATENT DOCUMENTS

| 8,026,805 | B1 * | 9/2011 | Rowe .......................... 340/539.1 |
|---|---|---|---|
| 2006/0015902 | A1 | 1/2006 | Matsuura et al. |
| 2007/0204308 | A1 * | 8/2007 | Nicholas et al. ................. 725/86 |
| 2010/0076968 | A1 * | 3/2010 | Boyns et al. .................... 707/732 |
| 2010/0153292 | A1 * | 6/2010 | Zheng et al. .................... 705/347 |
| 2011/0137818 | A1 * | 6/2011 | Goad et al. ..................... 705/347 |
| 2012/0278831 | A1 | 11/2012 | Van Coppenolle et al. |
| 2013/0007830 | A1 | 1/2013 | Klappert et al. |
| 2013/0067515 | A1 | 3/2013 | Barish |

OTHER PUBLICATIONS

"U.S. Appl. No. 13/684,304, Non Final Office Action mailed Aug. 2, 2013", 9 pgs.
Koren, Yehuda , "The Bellkor Solution to the Netflix Grand Prize", Retrieved from Internet <http://www.netflixprize.com/assets/GrandPrize2009_BPC_BellKor.pdf>, Aug. 2009, 10 pgs.
Piotte, Martin et al., "The Pragmatic Theiry solution to the Netflix Grand Prize", Pragmatic Theory Inc., Canada, Retrieved from Internet <http://www.netflixprize.com/assets/GrandPrize2009_BPC_PragmaticTheory.pdf>, Aug. 2009, 92 pgs.
Smith, Greg , "White Paper: Content Personlization", BEAWebLogic Portal, Retrieved from Internet <http://docs.oracle.com/cd/E13218_01/wlp/docs81/whitepapers/pdf/p13n.pdf>, May 2004, 30 pgs.

(Continued)

Primary Examiner — Oschta Montoya
(74) Attorney, Agent, or Firm — Kwan & Olynick LLP

(57) ABSTRACT

Techniques and mechanisms described herein facilitate the performance of geographic context weighted content recommendation. According to various embodiments, information identifying one or more viewing events or actions detected in association with a designated content management account at a media system may be received. The one or more viewing events or actions may have associated therewith location information indicating a location at which the one or more viewing events or actions occurred. The designated content management account may provide access to a plurality of media content items via the media system. The designated content management account may be associated with a geographic viewing profile. The geographic viewing profile may designate one or more of the plurality of media content items for recommendation in association with the designated content management account. The geographic viewing profile may also designate a geographic context for recommending the designated media content items.

18 Claims, 9 Drawing Sheets

(56) References Cited

OTHER PUBLICATIONS

Toscher, Andreas et al., "The BigChaos Solution to the Netflix Gran Prize", commendo research & consulting, Neuer Weg 23, A8580 Koflach, Austria, Retrieved from Internet <http://www.netflixprize.com/assets/GrandPrize2009_BPC_BigChaos.pdf>, Sep. 5, 2009, 52 pgs.

Yu, Zhiwen et al., "A Service-Oriented Platform for Ubiquitous Personalized Multimedia Provisioning", Journal of Universal Computer Science, vol. 16, No. 10 (2010), 1291-1310 submitted: Jul. 29, 2008, accepted: Mar. 9, 2009, appeared: May 28, 2010 © J.UCS, Retrieved from Internet <http://www.jucs.org/jucs_16_10/a_service_oriented_platform/jucs_16_10_1291_1310_yu.pdf>, May 28, 2010, 20 pgs.

* cited by examiner

GEOGRAPHIC CONTEXT WEIGHTED CONTENT RECOMMENDATION

TECHNICAL FIELD

The present disclosure relates to the recommendation of media content items.

DESCRIPTION OF RELATED ART

Content recommendation engines may be used to predict media content items that a user may be likely to enjoy. Many content recommendation engines rely upon mathematical algorithms to compute predictive models for content recommendation. The predictive models facilitate the selection of available but unviewed content items for recommendation to the user. Such selections are often based at least in part on the user's prior viewing habits. In many cases, however, developing an accurate recommendation for specific content may be difficult, such as when a user has viewed a relatively small amount of content or when the user's viewing history does not sufficiently match other users' viewing history.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
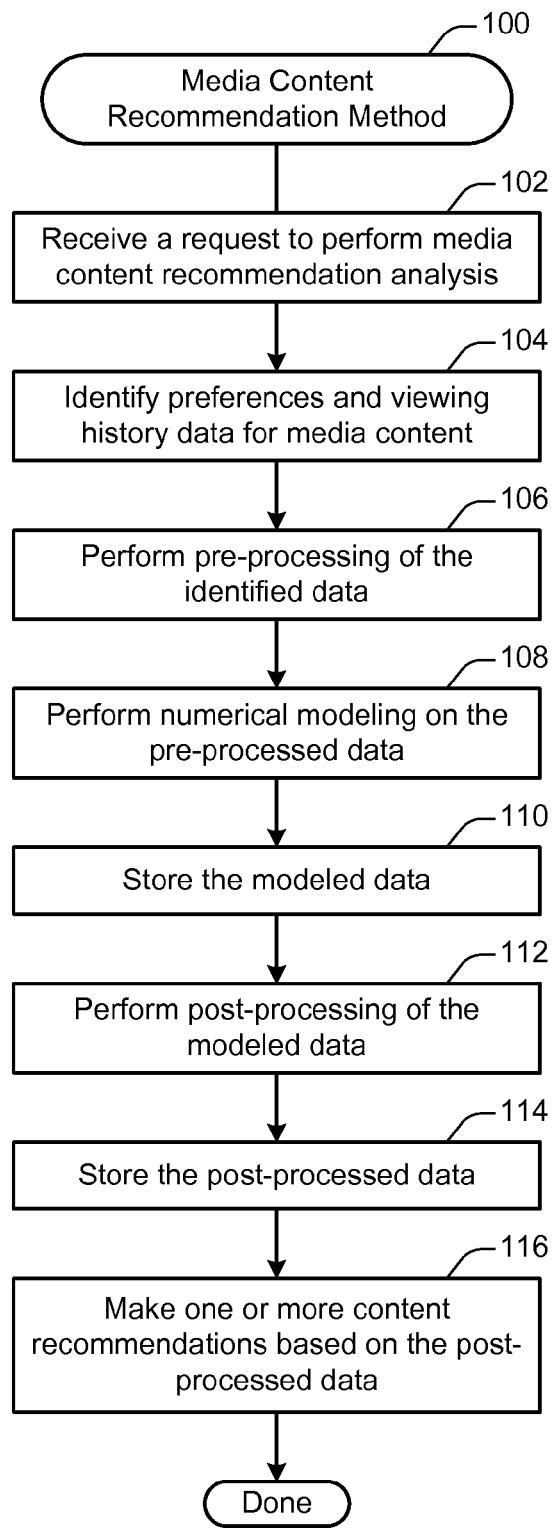
FIG. 1 illustrates an example of a method for recommending media content, performed in accordance with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the recommendation of media content items. Many content recommendation engines rely upon mathematical algorithms to compute predictive models for content recommendation. The predictive models facilitate the selection of available but unviewed content items for recommendation to the user. Such selections are often based at least in part on the user's prior viewing habits. According to various embodiments, recommendation systems described herein may employ a two-phase approach. First, a recommendation system may perform offline, complex calculations on large volumes of data to present baseline recommendations. Then, the recommendation system may supplement this baseline data with branching options in real-time or near real-time based on ongoing user interactions. The recommendation system may be used to react quickly to user actions, supplying updated or tailored recommendations that reflect both a user's past viewing history and the user's recent viewing patterns. For instance, the recommendation system may supply recommendations that are selected based on a user's viewing history as associated with different geographic locations.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices, such as televisions, laptop computers, tablet computers, personal computers, and mobile phones.

According to various embodiments, a media content recommendation engine may include one or more algorithms or formulas for recommending content. The media content recommendation engine may, for example, compute matrix factorizations and permutations based on information such as preference and viewing history information associated with a user account. These computations may be used to match users with media content that they have not yet watched.

According to various embodiments, various types of information may be used as inputs to create media content recommendations for users. In some cases, a user may expressly indicate preferences regarding media content through such activities as providing a rating of a media content item or indicating that a media content item is liked or disliked. In other cases, a user may implicitly indicate preferences regarding media content. For example, a user may exhibit a pattern of watching westerns, dramas, or programs that involve particular cast members or directors. As another example, a user may tend to request to view detailed information regarding particular types of content.

According to various embodiments, many content recommendation techniques involve matching a user's historical content interaction to the factorized historical interactions of other users. Based at least in part on this matching, the recommendation system may produce a list of media content items to recommend to the user. Each of the media content items in the list may be assigned a ranking relative to other items in the list. The ranking may reflect the strength of the recommendation and/or the degree of certainty with which the user is expected to enjoy the recommended media content item. For instance, a media content item that is better matched to the user's viewing history and preferences than another media content item may be assigned a relatively higher ranking.

According to various embodiments, a media system may be implemented at least in part via a large, distributed computing environment. In general, the complexity of the recommendation procedure is positively correlated with the quality of the media content recommendations that are produced. Thus, providing accurate and timely media content recommendations that are personalized to the end-user may be a relatively costly operation from the standpoint of computing resource utilization. Providing such recommendations may involve a significant amount of data mining that requires too much information and too many computing resources to be performed at a client machine or in an offline environment. Accordingly, at least some of the recommendation process occurs when a user is not interacting with the media content service and may be based on information such as the user's prior interactions with the service as well as other users' interactions with the service. This phase of the recommendation process may identify to a high level of accuracy the content that a user is most likely to enjoy.

However, offline, back-end recommendation analysis techniques alone cannot account for real-time demands and the spontaneous nature of what a user may be interested in at any given point of time. According to various embodiments, the overall recommendation engine may include the ability to react dynamically, for instance within a set of pre-determined geographic viewing profiles, to offer alternative content recommendations based on current user actions. The recommendation engine may include a front-end component that can receive real-time or near real-time inputs from the end user and translate them into rapid adjustments to the current list of recommendations. Then, the received inputs may be sent back to the offline, back-end numerical modeling system for recompilation into the master dataset so that updates and adjustments can be made periodically or occasionally to the baseline recommendation analysis. When the baseline recommendation analysis incorporates these inputs, the recommendations may be returned with updated branching alternatives, and the process can begin again.

For example, based on a user's past viewing history and preference information as well as any other information available to the recommendation engine, numerical modeling techniques may identify two separate viewing patterns associated with a content management account. The first viewing pattern may correspond to one geographic context, while the second viewing pattern may correspond to a different geographic context. These viewing patterns may reflect different viewing trends associated with the viewing of media content items in different locations. For instance, a content management account may be associated with one pattern of content viewing when content is viewed from home and another pattern of content viewing when content is viewed at a user's workplace.

According to various embodiments, when these patterns are modeled, the recommendation engine may generate two separate recommendation sets which can be separately presented to the user, such as by genre tags. Then, the user's geographic context may be determined based on various types of information, and an appropriate viewing profile may be selected. For instance, the system may receive a request from a computing device and predict the location of the computing device based on information such as an IP address associated with the computing device. Alternately, a user may select a geographic viewing profile to explore.

According to various embodiments, a geographic context viewing profile may be created based on a set of geographically-relevant data points related to where content has been viewed in the past. Then, recent geographic context information collected from a client machine may be used to inform and refine recommendations for subsequent content recommendations. These content recommendations may be provided to the end-user based on the user's location by creating a series of geo-relevant viewing profiles or models of behavior. By modeling behavior based on different geographical boundaries of usage, the quality of the recommendations may be improved.

According to various embodiments, content views associated with the system may be tracked and modeled via some form of geo-relevant location code so that the absolute or relative location of where the content has been viewed can be used as a data point to inform the content recommendation engine. Global Positioning System (GPS), IP address, zip code, mobile phone tower positioning data, or other information may be used to estimate or determine a user's absolute or relative location. Based on this information, content viewership for individuals in the system or aggregated groups/demographics can be modeled to form patterns or abstractions of usage that serve as baselines to inform the specific recommendations relevant for returning location-specific data in the future. At an individual basis, for example, a user's viewership data may be modeled such that the vast majority of their usage, clustered around personal computer and television-centric viewing, can be determined to be "home" usage.

Suppose, for instance, that a content management account is associated with a set of viewing history and preference information. The viewing history and preference information may identify a location associated with some or all instances of content being viewed in association with the content management account. The content management account may be associated with different geographic viewing profiles, such as a "home" zone, a "work" zone, and a "vacation" home. As the user accesses the media system from each of these viewing locations, the system may determine the viewer's location in real time and use this information to inform the content recommendation engine to alter the content items recommended to the user. For example, when accessing the media system from home, the user may receive recommendations associated with a more "standard" lineup of programming, such as television programs and movies with in-home, co-watching options. However, when accessing the media system at work, the user may be presented with a few standard television options, but most of the content recommendations may be focused more heavily on news, financial updates, and sports excerpts. This work-focused content may be shorter or more easily consumed snippets of relevant content rather than long-form content. Next, when accessing the media system while traveling, the user may be presented with movies, travel channel information, local news relevant to the area that includes their current location, and other such content that they might be more likely to prefer when traveling.

According to various embodiments, the media system may be location-aware. That is, the media system may receive, analyze, and use geographic context information such as the geo-location of prior content views, the geo-location of ongoing content views, and current user locations. Thus, content recommendations can be used in real-time in combination with geo-location information to provide targeted or sponsored advertising or information. In the example above, while traveling for vacation the user may be presented with media content from the local tourism bureau or local restaurants and businesses in the form of either sponsored content or promotional materials relevant to their "vacation" status and their geographic location. Similarly, users in any other zone, such as "commute" or "work", may be presented with sponsored or promotional content based on a combination of their viewing history, current location/zone, and proximity to any relevant geographic sponsors or events. For example, a particular user may frequently view movies, may have seen prior "superhero" movies, and may be currently located in a geographic location near a movie theater that is showing the currently running "Batman" movie. Such a user may be presented with a promotional trailer or other media content as a mechanism to entice them to not only view the relevant content on the media service, but also visit the location in their area.

Various geographic viewing patterns may be determined when calculating the baseline recommendations. Then, the logic of making the last-minute adjustments for the borderline content may be made lightweight and flexible enough so that the content recommendations can be adjusted based on very recent viewing patterns. These last-minute recommendation adjustments may be made based on relatively simple, deterministic server-side calls or client-side calls, so that up-to-date recommendations can be displayed to the end user based on the user's recent actions.

According to various embodiments, the model for weighting how geographic distance and zones are factored or implemented may be flexible and adjustable so that it can be continually or periodically refined and tweaked to provide improved content recommendation results over time. For instance, the media system may monitor and survey the relevance of returned results and provide continuous improvement of the system with new data.

According to various embodiments, the system may employ a back-end component that refactors the base dataset when necessary to incorporate user viewing history and preference information into the set of baseline recommendations. The system may also employ a front-end component that maintains a recommendation action buffer for adapting to a user's current geographic context. In particular embodiments, pre-filtering and post-processing recommendation data may allow a media system to update recommendations to end users based on their most recent interactions with the service. At the same time, processing-intensive calculations, such as re-calculating baseline recommendations, may be performed less frequently.

According to various embodiments, pre-filtering and post-processing recommendation data to formulate content recommendations based on geographic context may allow a media system to create more accurate content recommendations for its users. In some cases, users may experience higher levels of engagement with the media system and/or increased content consumption. Alternately, or additionally, user preferences may be inferred without requiring that the user expressly indicate a preference regarding a content item. Accordingly, users may enjoy higher levels of satisfaction with the content access and management services provided by the media system.

According to various embodiments, some or all of various types of input information may be weighted based on various criteria. Weighting the input information may in some cases improve the validity and relevance of the data sets returned from increasingly large and complex series of usage statistics. Additionally, or alternately, weighting the input information may provide increasing quality of experience and better targeting of returned results from the searched data. In particular embodiments, the types of weights that may be applied to the input information may be strategically determined based on factors such as the observed behaviors of the users interacting with the system.

According to various embodiments, a weighting factor may be used to treat a data point different during numerical modeling. For example, a positive weighting factor may render a data point more significant during modeling, while a negative weighting factor may render a data point less significant. As another example, a weighting factor greater than one may render a data point more significant during modeling, while a weighting factor between zero and one may render a data point less significant. The precise effect of weighting factors may be strategically determined based on factors such as the type of numerical modeling being performed.

According to various embodiments, the model may be implemented in terms of percentage weighting, integer weighting, real number weighting, weighting on a range of numbers, or any other weighting scale. In particular embodiments, the model is not based on fixed weighting values, but rather is flexible and adjustable so that it can be refined and tweaked to provide improved content recommendation results over time. For instance, the relevance of returned results can be monitored and surveyed to improve the system with new data. For example, in the case of percentage weighting, a single view of a piece of content may yield a weighting value of 100%, 90%, 110%, or any other value. Multiple repeated views may be weighted at 100% relevance, 150% relevance, or any other value. Moreover, those rating values may be altered dynamically over time to improve the recommendation results.

According to various embodiments, techniques and mechanisms described herein may facilitate the adjustment of media content item rankings within a media content item recommendation list. In particular embodiments, a content recommendation technique may produce a potentially large number of rank-equivalent or approximately rank-equivalent recommendations. It is anticipated that many users, such as users with similar historical content interactions, may share similar recommendation lists that include similar sets of rank-equivalent recommendations. In such cases, the relative success of recommendations provided to users with similar or approximately rank-equivalent recommendation sets may be compared. Success for a recommendation may be based on whether the recommendation tends to be selected for playback by users, whether the recommendation meets a success criteria threshold, whether the recommended item tends to receive positive or negative reviews, or various other criteria. Recommendations that are considered successful for users provided with similar content recommendations may be increased in relative ranking in future recommendation sets for other users. Similarly, recommendations that are considered unsuccessful for users provided with similar content recommendations may be decreased in relative ranking in future recommendation sets for other users.

Many of the recommendation techniques are described herein with reference to content items. The recommendation techniques described herein are widely applicable to a variety of content divisions. For example, a media content item may be an individual piece of content such as a video object. As another example, a media content item may be a standardized content channel such as a television channel or a personalized content channel created by the media system. As yet another example, a media content item may be a content category such as a genre. Also, although content may be referred to herein as video content, the techniques and mechanisms described herein are generally applicable to a wide range of content and content distribution frameworks. For example, the content may be media content such as video, audio, or image content.

FIG. 1 illustrates an example of a method 100 for recommending media content, performed in accordance with various techniques and mechanisms of the present invention. According to various embodiments, the method 100 may be performed at a media system or at any other computing system capable of performing media content analysis.

Figure 3:
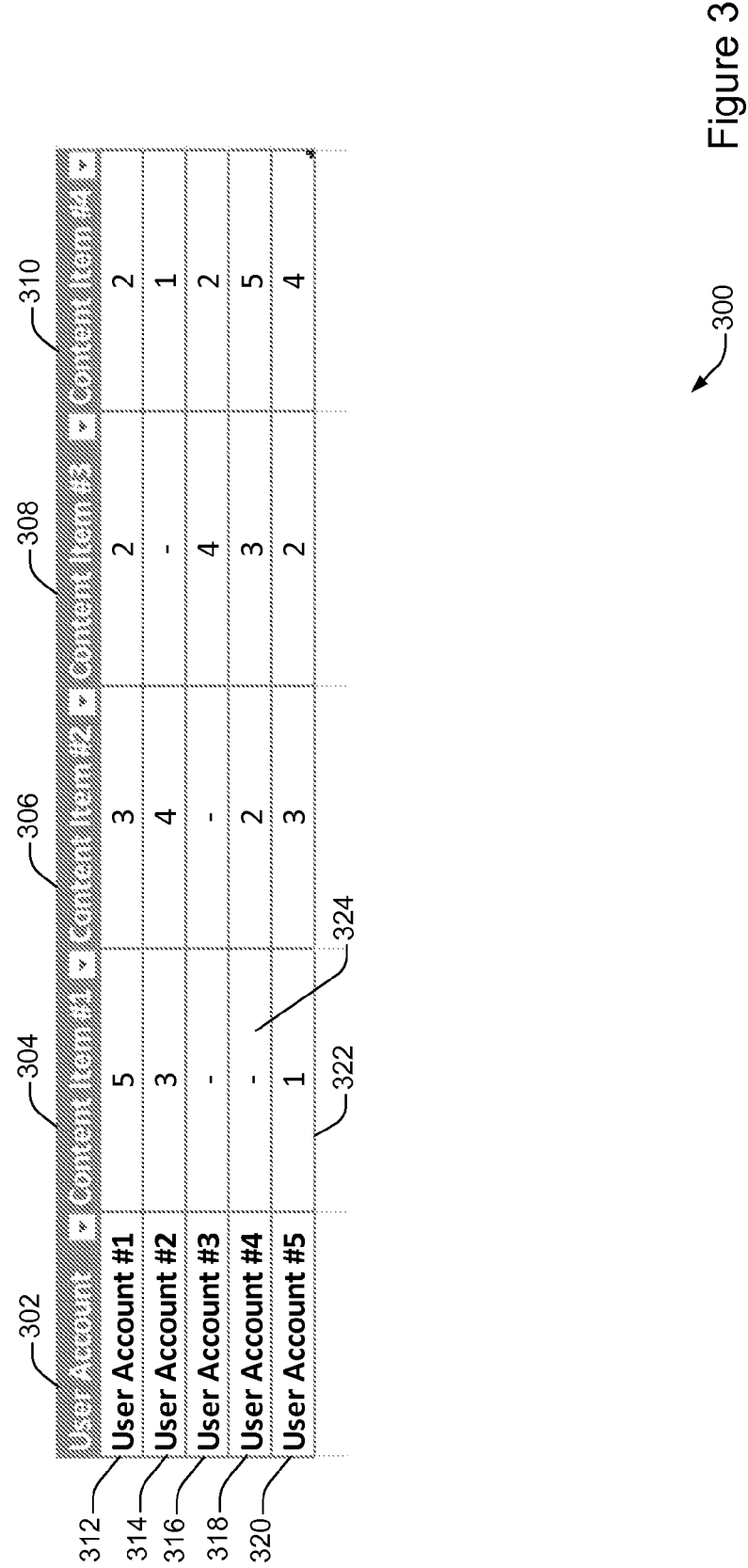
FIG. 3 illustrates an example of a media content preference data and recommendation chart.

In particular embodiments, the method 100 may be used to estimate preferences for media content items. Content preferences and viewing history information associated with a user account may be combined with similar information associated with other user accounts. Then, the resulting data may be processed, analyzed, and modeled to estimate preferences for content that has not yet been presented in association with a content management account. The estimated preferences may be used to formulate recommendations for content items that a user or users associated with a content management account might like to view. One example of the type of data that may be analyzed and/or created in conjunction with the method 100 is shown in FIG. 3.

At 102, a request to perform media content recommendation analysis is received. According to various embodiments, the request may be received at a media system such as the media systems discussed with respect to FIGS. 2, 7, and 8. Alternately, or additionally, the request may be received at a different computing system such as an on-demand or cloud computing system accessible via a network such as the Internet.

According to various embodiments, the request may be generated based on any of a variety of triggering events. For example, a user may initiate a request to perform the media content recommendation analysis. As another example, the request to perform the media content recommendation analysis may be automatically generated based on a triggering event. For instance, the request may be generated when a sufficient amount of new preference or viewing history data has been received, when a sufficient number of new users are added to the system, or when a designated time period has elapsed since media content recommendation analysis has last been performed.

In particular embodiments, the request may be generated based on a scheduled or periodic triggering event. For instance, media content recommendation analysis may be performed a designated number of times (e.g., once, twice, etc.) every minute, hour, day, week, month, or any other time interval. According to various embodiments, the frequency with which media content recommendation analysis is performed may be strategically determined based on a variety of factors that may include, but are not limited to: the amount of data being analyzed, the types of data being analyzed, the computing resources available, the type of analysis being performed, the frequency with which new content is added to the system, and the quality of the resulting recommendations. For example, in some systems new content is added daily, so the method 100 may be performed on the order of once per day. In other systems, new content such as short video clips is added continuously, and at least some of the content may include time-sensitive information such as weather reports. In these systems, the method 100 may be performed more frequently.

At 104, preference and viewing history data for media content is identified. According to various embodiments, the data identified at operation 104 may include any information relevant to forming an estimate of user preferences regarding media content. The data may include, but is not limited to: content items viewed, content categories or genres viewed, dates and/or times when content was viewed, preferences expressed regarding content items, content channels, or content categories, percentages or other quantifiers for the amount of a content item that was viewed, the number of times a content item or category was viewed, a location at which a content item was viewed, and the device or devices at which a content item was viewed.

At 106, one or more operations related to pre-processing the identified data are performed. According to various embodiments, pre-processing may include any operations related to selecting, filtering, sorting, updating, weighting, analyzing, or otherwise treating the data prior to the performance of the primary numerical modeling used to estimate preferences. For instance, pre-processing may involve weighting the viewing history and content preference data by time, by a number of views, by percent-consumed, and/or by other factors.

In particular embodiments, pre-processing the identified data may be used to emphasize a particular attribute or attributes for relevance. For instance, viewer preferences regarding some types of media content items such as news reports may be sensitive to time of day. That is, users may wish to view news reports in the morning or evening, but not during the middle of the day. Accordingly, pre-treating may be used to emphasize an attribute of the viewing data, such as time of day, that may be particular relevant in some or all contexts.

At 108, numerical modeling is performed on the pre-processed data. According to various embodiments, the numerical modeling may analyze the pre-processed data to estimate preferences for content. In particular embodiments, preferences may be estimated for content items that have not yet been presented in association with a content management account. Alternately, or additionally, preferences may be estimated for content that has been presented, such as content that has been viewed but that was not rated. In many systems, numerical modeling is a computationally complex task that requires a relatively large amount of computing resources. For instance, numerical modeling may require the computation of matrix operations for large matrices or other such time-consuming tasks.

According to various embodiments, various types of numerical modeling may be performed. The modeling techniques may include, but are not limited to: log-likelihood techniques, Pearson correlation, Rocchio Relevance Filtering, k-nearest neighborhood, Slope One, collaborative filtering techniques, content-based filtering techniques, hybrid recommender techniques, Bayesian Classifiers, cluster analysis, Alternative Least Squares with Weighted Lambda Regularization, Restricted-Boltzman Machines-Gradient Boosted Decision Trees or other types of decision tree techniques, and artificial neural networks. The choice of modeling techniques may depend on factors such as the type of data being analyzed and the type of analysis being performed. In particular embodiments, modeling techniques may be strategically determined based on the factors such as the relative efficacy of different techniques when applied to a particular media system, user base, and/or data set.

At 110, the modeled data is stored. According to various embodiments, the modeled data may be stored on a storage medium within or accessible to the media system. The modeled data may be stored so that it may be retrieved to provide content recommendations and/or to perform post-processing of the modeled data. In particular embodiments, different types of post-processing may be performed on a modeled data set. Accordingly, the modeled data may be stored so that it can be retrieved separately for performing different types of post-processing.

At 112, post-processing of the modeled data is performed. According to various embodiments, post-processing of the modeled data may include any operations related to selecting, filtering, sorting, updating, weighting, analyzing, or otherwise treating the data after the performance of the primary numerical modeling used to estimate preferences.

In particular embodiments, post-processing of the modeled data may be performed to update or edit the data for providing feedback for the next iteration of the media content recommendation process 100. For instance, new media content preferences or viewing history information may be received. This information may be used to update the data identified at operation 104. Alternately, or additionally, the new information may be used to check the validity of the recommendations produced by the numerical modeling or post-processing operations. For example, a user may view and/or indicate a preference for a media content item recommended to the user. This information may be used as positive feedback, positively reinforcing the process or data that led to the recommendation. As another example, a user may not view or may indicate a preference against a media content item recommended to the user. This information may be used as negative feedback, negatively reinforcing the process or data that led to the recommendation.

In particular embodiments, post-processing of the modeled data may be performed to provide updated recommendations based on new information. For instance, new viewing history or content preference information may be received after numerical modeling is performed at operation 108 but before the method 100 is performed again. As discussed herein, numerical modeling is in many systems a computationally complex task that requires a relatively large amount of computing resources. Post-processing may allow the recommendation system to provide updated recommendations based on new information without incurring the relatively large computational costs associated with full numerical modeling of the data set. For example, post-processing may involve numerical modeling that uses as input a limited subset of data rather than a complete data set. As another example, post-processing may involve a simpler form of numerical modeling that is less computationally intense than that employed in operation 108.

In particular embodiments, post-processing of the modeled data may be performed to provide media content recommendations for new users of the recommendation system. For example, the recommendation method 100 may be performed on a daily basis. After the method is performed, a new user may join the system and view several pieces of content in the first day, before the next iteration of the recommendation method 100. In this case, post-processing may be used to provide the new user with content recommendations even before the next iteration of the recommendation method 100. Because the post-processing recommendation process may be less complete than the full numerical modeling performed at operation 108, the post-processing procedure may provide provisional recommendations that are improved upon by the next iteration of the numerical modeling process.

In particular embodiments, post-processing of the modeled data may be performed to provide media content recommendations for different viewing patterns associated with a single content management account. In one example, a content management account may be used by different members of the same family. The father may use the account to view sporting events, while children may use the account to view Disney movies. Accordingly, the recommendation engine may recommend a variety of media content items that reflect the family members' varied tastes in content. These recommendations may be refined via post-processing based on recent viewing history. For instance, if the account is being used to watch a basketball game, then the recommendations shown after the basketball game is viewed may be for other sporting events. If instead a pattern of Disney movie viewing is detected, then post-processing may be used to refine the media content recommendations to select those that match this viewing pattern.

In another example, a viewing pattern associated with a content management account may change abruptly. For instance, the content management account may be primarily used to view content typically enjoyed by adults, such as sporting events and news broadcasts. However, the viewing pattern may suddenly change to cartoons, such as when an adult hands a content playback device such as a tablet computer to a child. Even though this viewing pattern does not match the pattern associated with the content management account, post-processing may be used to recommend other content related to these recent viewing choices, such as other cartoons.

At 114, the post-processed data is stored. According to various embodiments, the storing of the post-process data may be substantially similar to the storing of the modeled data discussed with respect to operation 110. The post-processed data may be stored in any way that makes it accessible to the recommendation for providing content recommendations and performing other analysis. The post-processed data may include, for potentially many different content management accounts, estimated preferences for potentially many different media content items. One example of the type of data that may be analyzed, created, and stored in conjunction with the method 100 is shown in FIG. 3.

At 116, one or more content recommendations are made based on the post-processed data. According to various embodiments, the content recommendations may be provided to a client machine associated with a content management account. The content recommendations may be personalized according to the viewing history and content preferences of the content management account. The recommended content may be available via any content source that is accessible to the content management account. In particular embodiments, the recommended content may be available for presentation at any of a variety of content playback devices associated with the content management account.

According to various embodiments, content recommendations may be made based on one or more of a variety of factors. For example, content may be selected based on an estimate of the degree to which the content matches the viewing history and content preferences of the content management account, as discussed with respect to operations 102-114. As another example, more time-sensitive content such as live sporting events may be more likely to be selected than less time-sensitive content such as old movies.

According to various embodiments, one or more of the operations shown in FIG. 1 may be omitted. For example, in some instances pre-processing or post-processing of the data may be omitted. As another example, in some instances modeled data may not be stored separately from post-processed data.

Figure 2:
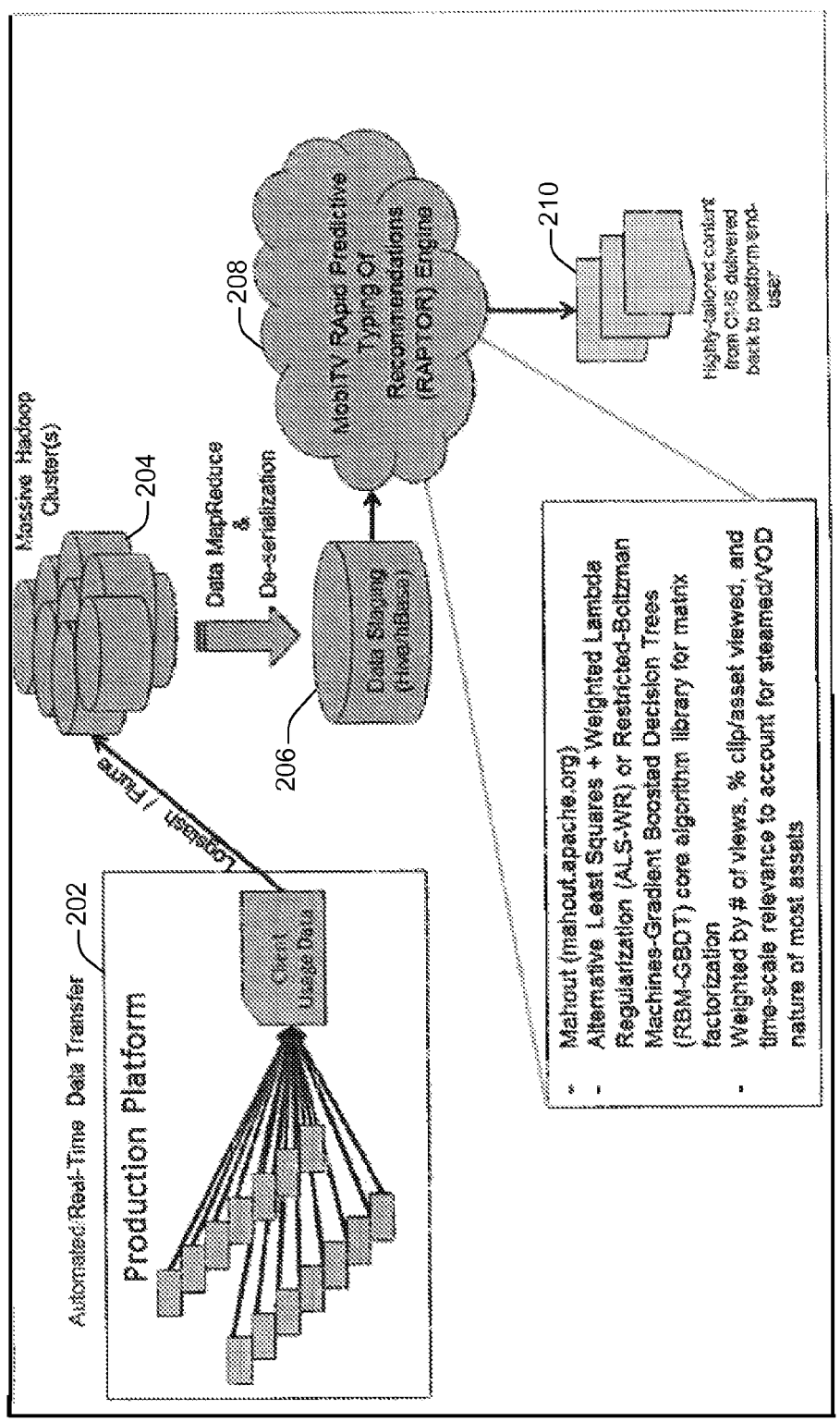
FIG. 2 illustrates an example of a system that can be used with various techniques and mechanisms of the present invention.

FIG. 2 illustrates an example of a system 200 that can be used with various techniques and mechanisms of the present invention. According to various embodiments, the system shown in FIG. 2 is a recommendation system that may be used to receive, analyze, and process data for providing media content recommendations. The system 200 includes a production platform 202, Hadoop clusters 204, a data storage system 206, a recommendation engine 208, and content items 210. The system 200 is presented at an abstract level, and many hardware and software components that may be present in a recommendation system are omitted for clarity. Various hardware and software components of systems, including components that are not shown in FIG. 2, are discussed with respect to FIGS. 7 and 8.

According to various embodiments, the production platform 202 is used to provide media content for presentation in association with many different content management accounts, each of which may be associated with potentially many different content playback devices. The production platform 202 may also be used to collect and aggregate client usage data. The client usage data may identify media content preference and viewing history information associated with the presentation of the content. For instance, when a user views a media content item, indicates a liking or disliking of a media content item, or selects a recommended content item for presentation, such information may be stored for analysis.

According to various embodiments, the one or more Hadoop clusters at 204 constitute a distributed computing system that allow potentially many different computers to coordinate while analyzing a potentially very large data set. The Hadoop clusters may be used to perform various types of data analysis such as MapReduce and deserialization. Although the system 200 uses Hadoop clusters, other recommendation systems may employ other hardware and/or software frameworks for data analysis. These frameworks may include, but are not limited to: columnar oriented database systems such as Cassandra, commercial large data systems such as Teradata, and open source relational databases such as Postgres.

According to various embodiments, the data staging system 206 may be used to store data for use in conjunction with the Hadoop clusters 204. For instance, the data staging system 206 may store an HBase database in a Hive data warehouse system. Alternately, the data staging system 206 may employ a different data storage and/or management system.

According to various embodiments, the recommendation engine 208 may be used to process the staged data for providing media content recommendations. The recommendation engine 208 may be used to perform any of a variety of operations related to recommendation. For example, the recommendation engine 208 may be used to perform a machine learning algorithm such as an algorithm performed via the Apache Mahout framework. As another example, the recommendation engine 208 may be used to perform numerical modeling, as discussed with respect to operation 106 shown in FIG. 1. As yet another example, the recommendation engine 208 may be used to perform pre-processing operations such as weighting viewing history and/or content preferences by a number of views, by a percentage or amount of a content item that was viewed, by the date or time when a content item was viewed, or by some other factor.

According to various embodiments, the content recommendations at 210 may be selected based on the analysis performed at the recommendation engine 208 or elsewhere in the recommendation system. The content recommendations may be provided to a user of a content playback device associated with a content management account. Based at least in part on the content recommendations, a user may select content for presentation on the content playback device or on another device. Providing content to the content playback device may be performed via the production platform 202. Additionally, information regarding media content preferences and viewing history related to the content recommendations provided at 210 may be stored as client usage data in the production platform 202 and used to provide updated media content recommendations.

FIG. 3 illustrates an example of a media content preference data and recommendation chart 300. According to various embodiments, the chart 300 includes information regarding media content preferences and viewing history for various user accounts. The chart 300 includes the content item columns 304-310, the user account column 302, the user account rows 312-320, and the content preference data cells 322 and 324.

According to various embodiments, the user account column 302 includes identifiers for user accounts. User accounts are also referred to herein as content management accounts. Each user account may be associated with one or more users of a content management system. Although only five user accounts are shown in FIG. 5, an actual data set may include any number of user accounts. For instance, many data sets include hundreds of thousands or millions of different accounts.

According to various embodiments, the content item columns 304-310 are each associated with a different media content item or content category. Each of the media content items may be analyzed by the recommendation system for the purposes of providing recommendations to the user accounts. In particular embodiments, not all of the media content items may be available to each user account. For instance, users of the media recommendation system may receive content from different sources, such as broadcast television and on-demand services such as Netflix. In this case, some users may have access to some content sources but not to other content sources.

According to various embodiments, each of the user account rows 312-320 includes a number of content preference data cells that correspond to different content items. Content preference data cells may be used to store any of various types of information. This information may include, but is not limited to: expressed preferences regarding a content item (e.g., a number of stars), a percent consumed of a content item, a location at which a content item was viewed, a date or time at which a content item was consumed, and a number of times that a content item was viewed.

According to various embodiments, various types of values may be stored within each of the media content data cells. For example, the data cell 322 stores a "1", which may indicate an expressed preference, a percent consumed, or some other viewing history or content preference information related to the first content item 304. As another example, the data cell 324 is blank, indicating that the content item has not yet been viewed in association with the fourth user account 318. As yet another example, data cells may be updated to include estimated values calculated by the media recommendation system.

According to various embodiments, the media recommendation system may calculate estimated values for any or selected ones of the blank data cells. For instance, the media recommendation system may calculate estimated values for all blank data cells associated with a user account, for all blank data cells associated with a user account, for all blank data cells associated with content items to which a user account has access, or for any other set of data cells.

According to various embodiments, media content preference and recommendation data may appear significantly different than the chart 300 shown in FIG. 3. For instance, in some techniques, specific data value estimates may be created for unviewed content items. Alternately, or additionally, data value estimates may be stored as differences between pairs in a sparse matrix, which may facilitate the rapid calculation of data value estimates for newly added content items.

Figure 4:
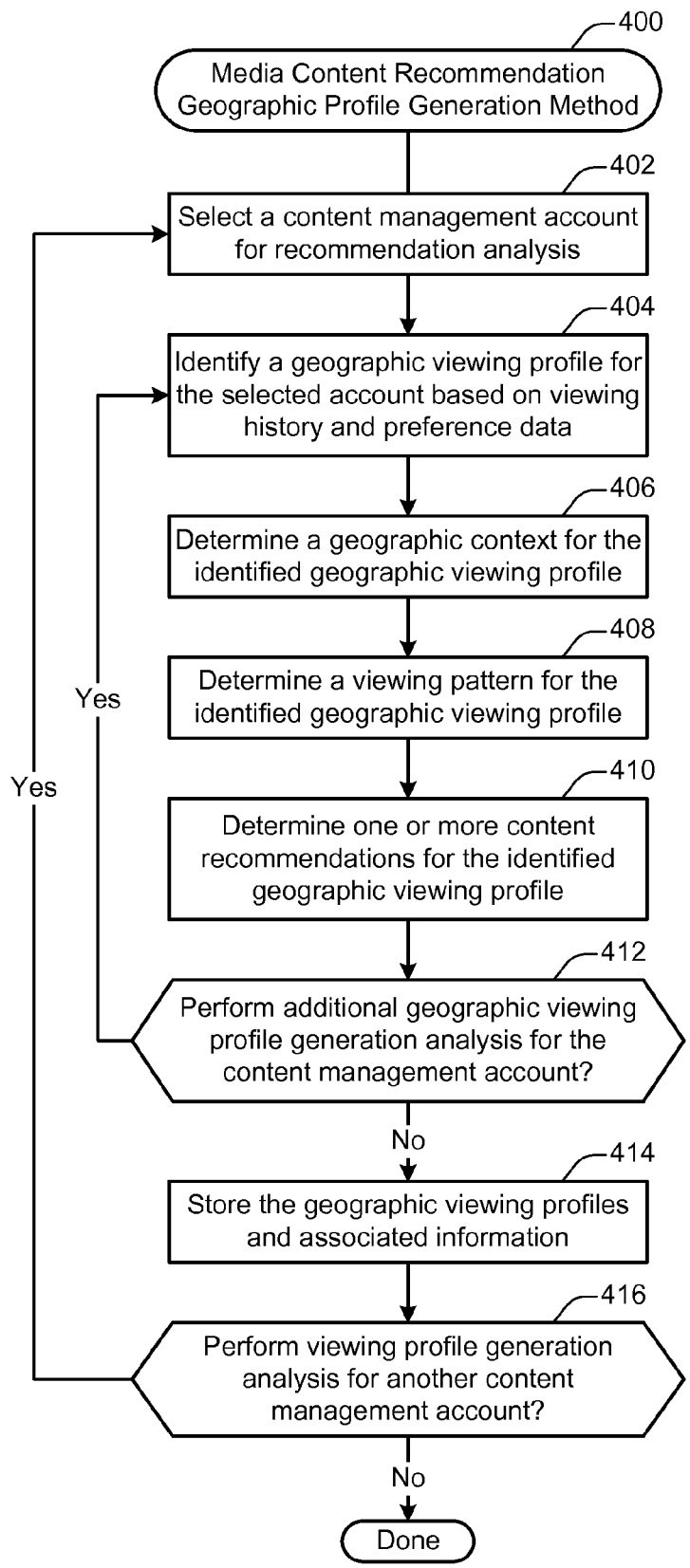
FIG. 4 illustrates an example of a method for generating geographic media content recommendation profiles.

FIG. 4 illustrates an example of a method 400 for generating media content recommendation geographic viewing profiles. According to various embodiments, the method 400 may be performed at a media system. The method 400 may be performed in conjunction with numerical modeling, as discussed with respect to operation 108 in FIG. 1. The method 400 may be used to analyze viewing history or preference data to create one or more geographic media viewing profiles that each reflect a viewing pattern associated with a content management account in a particular geographic context, such as an absolute or relative location or area.

According to various embodiments, the method 400 may be used to generate one or more geographic viewing profiles that may be activated when the media system determines that a user is accessing it from a particular location. For instance, geolocation-specific recommendations of content items may be provided to a viewer viewing content in association with a content management account if the viewing activity is performed at a particular location. These media content recommendations may be generated by a recommendation engine, as discussed with respect to FIG. 1.

According to various embodiments, geographic media content recommendation profiles may be generated in order to provide a dynamic recommendation experience that can quickly adapt to events or viewer actions. As discussed with respect to FIG. 1, numerical modeling to compute baseline recommendations may be performed periodically or occasionally rather than immediately after each newly detected event or user action. For instance, numerical modeling may be performed once per day, when a triggering event is detected, or according to some other schedule. By generating geographic viewing profiles that include content recommendations that can be provided to users based on geographic context information that is received in between iterations of the numerical modeling, the recommendations provided to viewers can be quickly updated. For instance, if a viewer accesses the media system from a "work" context, a geographic viewing profile may be triggered whereby the viewer is provided with recommendations for content that the user may be interested in viewing from that location.

At 402, a content management account is selected for geographic recommendation analysis. According to various embodiments, each content management account may be associated with viewing history or content preference data. The data for each content management account may identify potentially many different content items or content categories that have been viewed in association with the account. The data may include information such as which content items have been viewed, how much of each content items has been viewed, any expressed or inferred ratings for the content items, and any other type of data.

According to various embodiments, the data may include geographic context information identifying where content items have been viewed. The geographic information may identify an absolute location or a location relative to some reference point, such as a home or work place. A relative location calculation may be determined, for example, as a set of linear factors where the geolocation of a user is scaled to their respective displacement from a reference location. The geographic context information may include information such as zip codes, geospatial coordinates, IP addresses, or any other information for identifying location.

According to various embodiments, some or all of the content management accounts may be selected for geographic context profile generation. Content management accounts may be selected based on various factors. For example, a content management account may be selected because it is associated with a relatively large amount of viewing history and preference data, which may allow the recommendation engine to generate accurate different geographic context viewing profiles. As another example, a content management account may be selected because it is associated with a relatively small amount of viewing history and preference data, which may increase the need for identifying different viewing profiles for the account.

In particular embodiments, a content management account may be selected because it is associated with viewing history or preference data that is indicative of different viewing profiles. For instance, an account may be associated with content viewing history information that indicates that the account has been used to view different types of content from different locations. Such an account may be a good candidate for generating different geographic viewing profiles.

At 404, a geographic viewing profile is identified for the selected account. According to various embodiments, the geographic viewing profile may be identified based on viewing history and preference data. For instance, numerical modeling may be used to identify location-based commonalities or patterns within the viewing history or preference data associated with the content management account. Each geographic viewing profile may be associated with a geographic context that identifies location information for activating the viewing profile. Each viewing profile may also be associated with viewing pattern information that identifies the types of content that have been viewed in association with the identified location or area and/or the types of content for recommending for viewing at the identified location or area. Each viewing profile may also be associated with particular content recommendations created at least in part based on the geographic context and viewing profile.

According to various embodiments, viewing history or preference data for a user account may include commonalities or patterns that reflect different trends or modes of viewing. For instance, a single content management account may be associated with data that describes past viewing behavior for different types of content. For example, the account may have been used to view comedic and dramatic films, popular television shows, children's movies, news broadcasts, and sports programming. These content item views may be associated with location information.

At 406, a geographic context for the identified geographic viewing profile is determined. According to various embodiments, the geographic context may identify a "node" or "zone" associated with the geographic viewing profile. The scope of the zone may vary based on information such as the location of past viewing activity. For instance, viewing activity may cluster around a location such as a home or workplace.

According to various embodiments, various types of geographic contexts may be identified. As a first example, if the most common viewing location is tightly localized in a particular area, the viewing location may be identified as a "home" or "living room." As a second example, static clusters of usage outside of the home may be identified as "workplace" or "school" usage. As a third example, usage located outside the home while traveling within 10 miles of the home may be identified as "mobile" or "commute" usage. As a fourth example, usage located more than 10 miles of the home may be identified as "travel" or "vacation" usage. In a fifth example, different locations within a home, such as "living room," "bedroom," and "kitchen" may be identified.

In particular embodiments, the geographic context may identify one or more locations of interest. For instance, the geographic context information may identify a particular location as a sports stadium, office, movie theater, or vacation site.

At 408, a viewing pattern for the identified geographic viewing profile is identified. According to various embodiments, the viewing pattern may indicate the types of content items that tend to be selected when the context identified at operation 406 is active. For instance, the viewing pattern may identify categories, genres, or types of content that are viewed at a particular location. A category or type of content may be, for instance, television programs, movies, news, or sports. A content genre may be, for example, sports, comedy, or drama.

In particular embodiments, the viewing pattern may be associated with a baseline or default viewing profile. For instance, a particular content management account may be associated with a relatively heterogeneous "home" viewing pattern that reflects the combined viewing preferences of an entire family of viewers who share access to the account. Then, different family members may be associated with more specific geographic viewing profiles that match the viewing activity when only one of the family members is viewing content at some location outside the home. For instance, several different family members may select content from home. At the same time, selection of content from an office building location may be associated primarily with a parent, while selection of content from a school location may be associated primarily with a child.

In particular embodiments, the viewing pattern may be associated with at time of day. For instance, content selected from a "home" viewing location immediately after school may tend to be children's programming, while content selected from the same location in the late evening may tend to be news broadcasts or sports reporting.

According to various embodiments, the baseline viewing pattern may be selected for use in recommending content items when no more specific viewing pattern seems to match the viewing activity. Alternately, or additionally, some amount of content recommendations derived from the baseline viewing profile may be provided even when a more specific profile is being used. In this way, a viewer may be provided with specifically tailored content recommendations while at the same time, other non-specific recommendations may be provided in case the original viewer is joined or replaced by other family members or would like to view other types of content.

In particular embodiments, location information may be combined with other types of viewing history and preference information to identify more specific audience groups or demographics. In this way, viewing profiles may be created that are specific both to location and to viewers. For instance, a "home" viewing profile may be separated into a "child" profile and an "adult" profile. Then, if the media system detects activity from the "home" location, the system may analyze the activity to determine whether it more closely matches the "child" profile or the "adult" profile. In this way, a user may be provided with recommendations that reflect both the user's identity and the user's location.

At 410, one or more content recommendations for the viewing profile are determined. According to various embodiments, the one or more content recommendations may be determined by performing numerical modeling based on the viewing history and preference data associated with the content management account as well as data associated with other accounts. Numerical modeling to select content items for recommendation is discussed in further detail with respect to FIG. 1. The content recommendations may include specific content items, content categories or genres, or any other division or type of content.

According to various embodiments, one or more content recommendations may be made at least in part on past viewing activity at a particular location. For instance, the user may tend to watch some types of content when accessing the media system from home and other types of content when accessing the media system from a workplace. In many instances, some or all of the content may overlap. However, distinct viewing patterns may emerge from viewing history and preference data.

According to various embodiments, one or more content recommendations may be made based at least in part on likely viewing activity at a particular location. For example, if a user is traveling, the media system may predict that the user would like to view content such as local weather or news, even if the user has never before requested content from that location. As another example, the media system may identify a particular location as being associated with a user's work environment. Based on this identification, the media system may recommend short-form content such as video clips. As yet another example, the media system may identify a user as being in transit from one location to another. Based on this information, the media system may recommend audio content that can be consumed without watching a display screen.

In particular embodiments, the recommendations may be determined by performing numerical modeling while omitting viewing history and preference data not associated with the identified geographic viewing profile. Alternately, numerical modeling may be performed with all viewing history and preference data, and recommended content items related to the viewing profile may be selected from the set of recommendations produced by the numerical modeling.

At 412, a determination is made as to whether to perform additional geographic viewing profile generation analysis for the selected content management account. According to various embodiments, various criteria may be used to make the determination. For example, a designated threshold may identify or limit the number of geographic viewing profiles that are generated in association with a content management account. As another example, a designated threshold may identify a level of relevance or commonality for generating a geographic viewing profile based on viewing history and preference data. For instance, a determination may be made to not create a geographic viewing profile for content views that do not seem to fit any identifiable viewing pattern. As another example, a designated threshold may identify a minimum amount or portion of views associated with a particular geographic context for creating a geographic viewing profile.

At 414, the geographic viewing profiles are stored in association with the content management account. According to various embodiments, the geographic viewing profiles may be stored in a manner that allows the associated geographic context information to be compared with geographic context information received from a client machine, as discussed with respect to method 600 illustrated in FIG. 6. The geographic viewing profiles may be stored in a storage system such as a database configured to store profiles and recommendations for retrieval. The recommendations may then be retrieved from the storage system to provide to client machines such as content playback devices.

At 416, a determination is made as to whether to perform profile generation analysis for another content management account. As described with respect to operation 402, profile generation analysis may be performed for any or all of the content management accounts associated with data accessible to the recommendation engine.

Figure 5A:
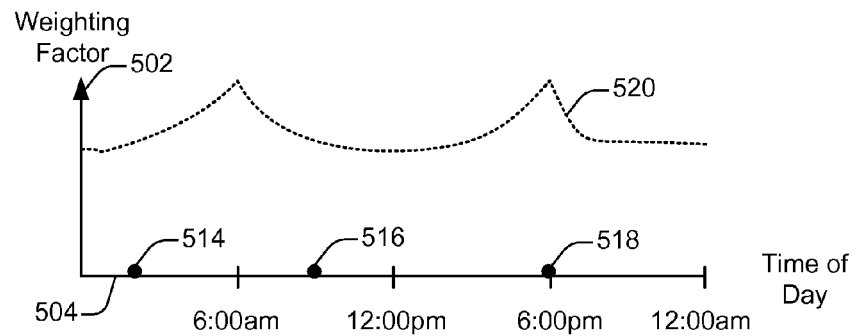
FIGS. 5A-5C illustrate examples of charts depicting pretreated data.
Figure 5B:
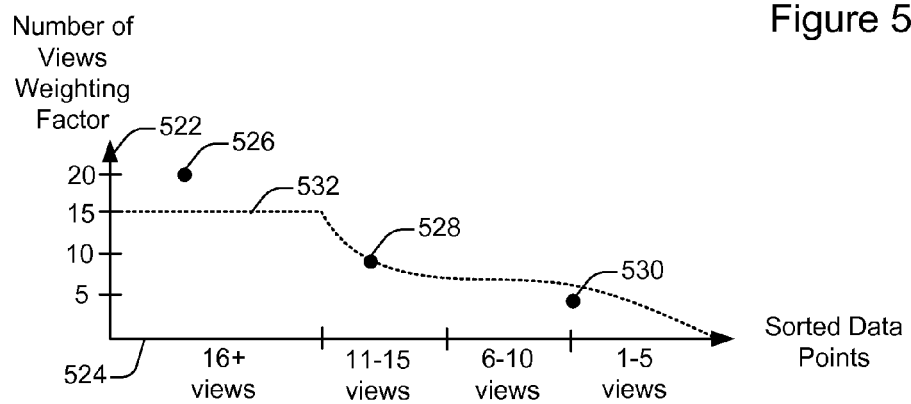
Figure 5C:
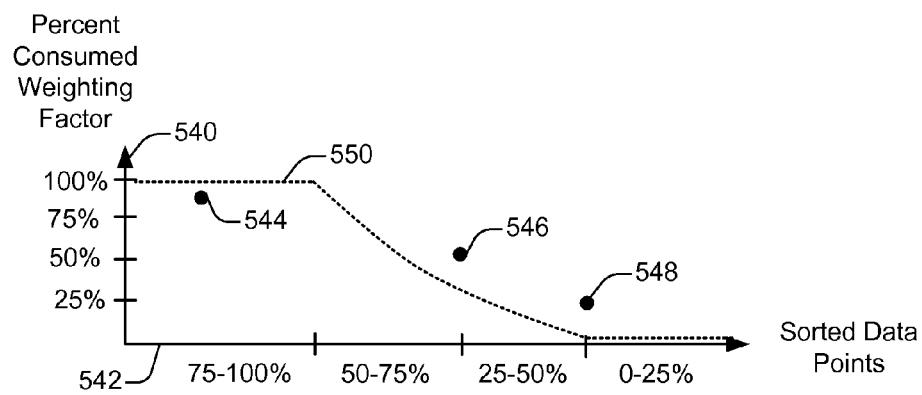

FIGS. 5A-5C illustrate examples of charts depicting pretreated data. According to various embodiments, the charts shown in FIGS. 5A-5C may depict the type of weighting operations that may be performed during pre-processing, as discussed with respect to FIG. 1.

According to various embodiments, each of the data points shown in FIGS. 5A-5C may identify at least a media content item and a content management account. In some cases, data points may identify other information, such as a number of views associated with the content item, a percent of the content item that has been consumed, a time of day that the media content item was viewed, or any other information. For the purposes of illustration, it will be assumed that each of the data points shown in FIGS. 5A-5C is associated with the same content management account.

These charts are presented in order to better elucidate various techniques and mechanisms described herein and need not be actually produced during the recommendation process. Additionally, the data presented on the charts are significantly simplified in comparison with actual data in most recommendation systems. For instance, each of the charts shown in FIGS. 5A-5C includes three data points, while data sets used in many recommendation systems may include hundreds of thousands or even hundreds of millions of data points.

In addition, the pre-processing and transformations shown in FIGS. 5A-5C are only simple examples of the types of pre-processing and transformations that may be performed in accordance with techniques and mechanisms described herein. Specific transformations may in many cases be much more complex. Also, transformations may be strategically determined based on a number of factors, including but not limited to the efficacy of specific transformations in producing reliable recommendations for a given media system, user base, and data set.

In FIG. 5A, the data points are aggregated and weighted by time of day. The chart shown in FIG. 5A includes a Y-axis 502, an X-axis 504, data points 514-518, and a transform 520. FIG. 5A shows an arrangement of the data points and the result of the transformation of the data by a transform function.

The chart shown in FIG. 5A corresponds to a transformation applied to news-related content items. It is anticipated that news-related content items may be time-sensitive in nature. That is, many users may tend to regularly view preferred news-related content such as news broadcast television programs in the morning or evening. In contrast, when users view news-related content at other times, the content may simply reflect some topical interest that does not reflect a strong preference for the content. Accordingly, it is anticipated that news programs viewed during the morning and evening may better reflect a user's preferences and tastes than news-related content viewed at other times. The transform shown in FIG. 5A may be used to adjust the weighting of content to reflect this anticipated preference pattern.

In particular embodiments, the data points included in a particular transformation need not include all data points available to the system or all data points associated with particular content management accounts. For instance, the transformation shown in FIG. 5A is directed primarily to news-related content, since other content may not reflect time-sensitive preferences in quite the same fashion. Accordingly, the transformation shown in FIG. 5A may be applied to news-related content items but not to other content items.

Each of the data points 514-518 represents a viewing event. Each data point identifies a media content item that was viewed, a content management account that was associated with the viewing, and a time of day that the media content item was viewed. In some cases, each data point may identify additional information. However, not all information associated with each data point is shown in FIG. 5A.

The X-axis 504 represents a time of day at which a content item associated with a data point was viewed. For instance, the media content associated with the data point 514 was viewed in the early morning, around 2:00 am. The media content associated with the data point 516 was viewed in mid-morning, around 9:00 am. The media content associated with the data point 518 was viewed in the early evening, at 6:00 pm.

The Y-axis 502 represents a weighting factor that is assigned by a transform. Prior to transformation, the different data points shown in FIG. 5 were weighted equally and thus treated as having equal significance. That is, each of the views of content items are treated equally when estimating user preferences and identifying unviewed content to recommend for viewing in association with the content management account. After the transformation, different data points may be weighted differently. For instance, in FIG. 5A, content items that were viewed around 6:00 A.M. and 6:00 P.M. may be treated as more significant than other content items.

In FIG. 5B, the data points are aggregated and weighted by the number of times that each content item has been viewed. The chart shown in FIG. 5B includes the X-axis 522, the Y-axis 524, the data points 526-530, and the transformation 532. FIG. 5B shows an arrangement of the data points and the result of the transformation of the data by a transform function.

The chart shown in FIG. 5B represents a view-weighted transformation. It is anticipated that a user who views one content item many times typically prefers it to another content item that the user views only once. Accordingly, the significance of a user's viewing of a content item in the recommendation engine may be weighted by the number of times that the user has viewed the content. For instance, an initial weighting factor may weight each content item by the number of times it was viewed. However, such a weighting may in some instances result in skewed inferences regarding user preferences. For instance, if a user views a content item such as a television news program or a humorous web video clip 60 times, a simple linear weighting factor may unduly skew the results toward content that is similar to the frequently-viewed content. Accordingly, a transformation may be applied that adjusts the weighting factor. For instance, the transformation function may cap the weighting factor at the high and/or make other adjustments to the weighting factor.

Each of the data points 526-530 represents a viewing event. Each data point identifies a media content item that was viewed, a content management account that was associated with the viewing, and a number of times that the media content item was viewed. In some cases, each data point may identify additional information. However, not all information associated with each data point is shown in FIG. 5B.

In particular embodiments, a media content item need not be an individual media content object such as a video. Instead, a media content item may be a television program, a content channel such as a television channel, or a content genre. Thus, an data point indicating that a media content item was viewed 20 times, for instance, may represent the repeated viewing of a news program or a television channel and not necessarily the repeated viewing of a single media content object. In particular embodiments, the scope of a data point may be changed and/or strategically determine to accommodate various recommendation applications.

The X-Axis 524 represents a number of views associated with each data point. For instance, the data point 526 is associated with a media content item that has been viewed 20 times, the data point 528 with a media content item that has been viewed 10 times, and the data point 530 with a media content item that has been viewed 5 times.

The Y-axis 522 represents a weighting factor that is affected by a transformation. Initially, the weighting factor for a given data point in FIG. 5B is the number of views associated with the content item represented by the data point. For instance, if a media content item is viewed 20 times, then it is assigned a weighting factor of 20, whereas a media content item that has been viewed once would be assigned a weighting factor of 0.

The transformation 532 is applied to the data points to adjust the weighting factors. Initially, the transformation 532 caps the weighting factor that can be applied to any data point at 15. That is, a user may continue to view a media content item more than 15 times, but the view-weight that is applied to the data point does not exceed 15. The transformation 532 then does not affect the weight associated with the data point 528, while it increases the weighting factor associated with the data point 530.

In FIG. 5C, the data points are aggregated and weighted by the percentage of each content item that has been presented. The chart shown in FIG. 5C includes the X-axis 542, the Y-axis 540, the data points 544-548, and the transformation 550. FIG. 5C shows an arrangement of the data points and the result of the transformation of the data by a transform function.

The chart shown in FIG. 5C reflects a percent consumed weighted transformation. It is anticipated that a viewer who views a greater percentage of one content item than another typically, and generally, prefers the first content item to the second. Accordingly, the significance of a data point in a recommendation system may be weighted according to the percentage of the associated content item that was presented to a user. However, it is anticipated that some differences in percentage viewed do not reflect differences in preferences. For instance, the final portion of some content items includes a credits sequence. For this and other reasons, some viewers may simply choose not to view the final portion of a content item. Thus, a viewer who watches 100% of one content item while only viewing 95% of another content item may not actually prefer the first content item to the second. Accordingly, a transformation may be applied to adjust the weighting values to reflect this and other user preferences patterns.

Each of the data points 544-548 represents a viewing event. Each data point identifies a media content item that was viewed, a content management account that was associated with the viewing, and a percentage or portion of the media content item that was viewed or presented. In some cases, each data point may identify additional information. However, not all information associated with each data point is shown in FIG. 5C.

The X-Axis 542 represents a percentage or portion of a content item that was viewed or presented. For instance, the data point 544 is associated with a media content item of which 85% was viewed, the data point 546 with a media content item of which 50% was viewed, and the data point 548 with a media content item of which 25% was viewed.

The Y-axis 544 represents a weighting factor that is affected by a transformation. Initially, the weighting factor for a given data point in FIG. 5B is the percentage of the content item represented by the data point that was presented in association with the content management account. For instance, if 100% of a media content item is presented, then it is assigned a weighting factor of 1, whereas a media content item of which only 25% has been viewed once would be assigned a weighting factor of 0.25.

The transformation 550 is applied to the data points to adjust the weighting factors. Initially, the transformation 550 scales up the weighting factor for media content items for which 75-100% of the item has been presented. That is, if 75-100% of a media content item is presented, then a weighting factor of 1 will be applied, effectively treating the media content item as if 100% of the item had been presented. Accordingly, the weighting factor for the data point 544 is scaled up to 100%. This part of the transformation reflects the idea that if a viewer watches nearly all of a media content item, he or she may be inferred to like it, and that small differences in high viewed percentages likely do not reflect differences in preferences.

Then, the transformation 550 scales the weighting factors for other data points, such as the data point 546. The data point 546 is associated with a content item of which 50% has been viewed, and its weighting factor is scaled down somewhat. This part of the transform reflects the idea that a viewer who stops viewing a content item halfway through may be estimated to have a relatively weak preference for the content item.

Finally, the transformation 550 scales down the weighting factor for media content items for which 0-25% of the item has been presented. For instance, the data point 548 is associated with a media content item of which 25% has been viewed. However, the weighting factor for the media content item is scaled down from 0.25 to 0. This part of the transformation reflects the idea that when a user watches very little of a media content item and then stops viewing it, the viewer may be inferred to not like the content item. Accordingly, small differences in the percentages of content items for which viewing is quickly terminated may not matter in the calculation of new recommendations.

Figure 6:
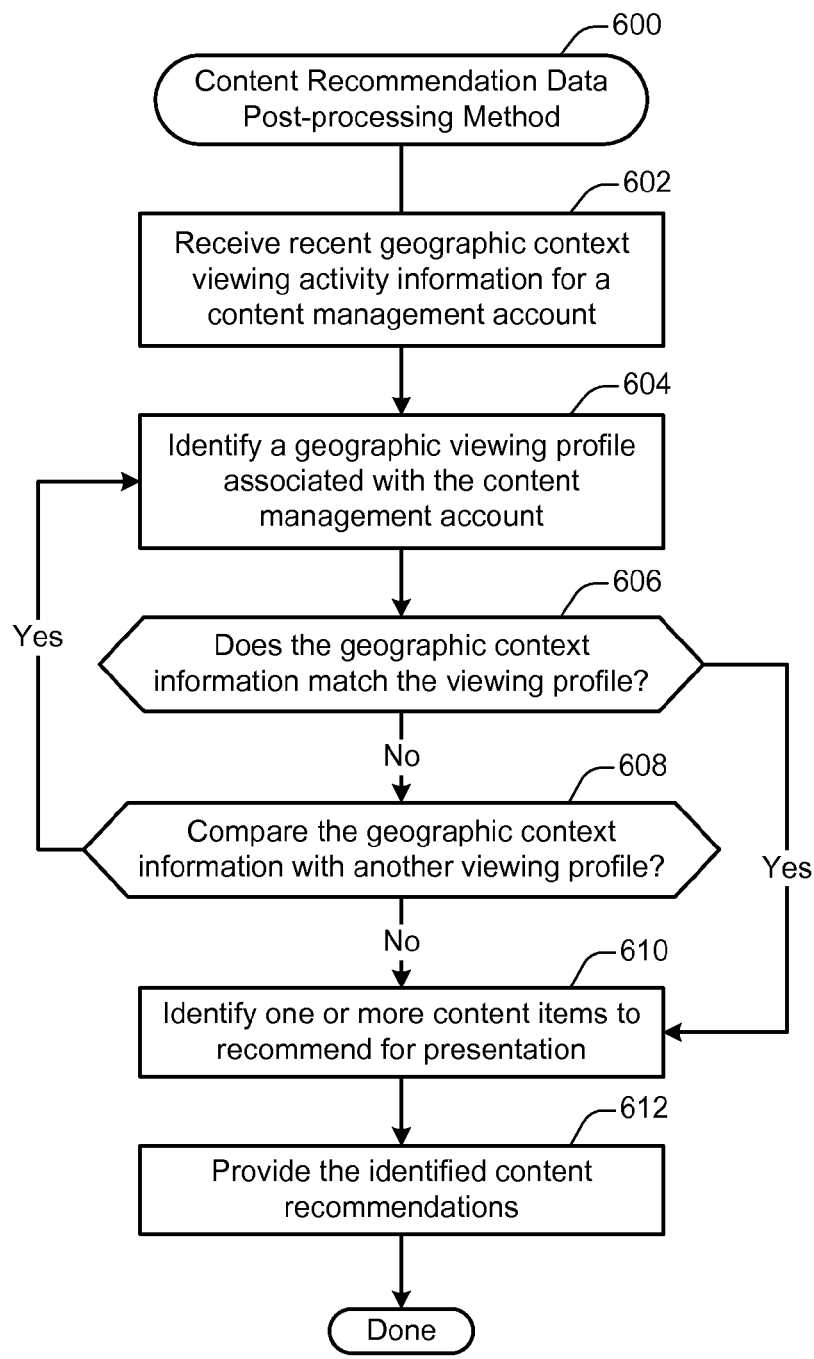
FIG. 6 illustrates an example of a method for post-processing recommendation data.

FIG. 6 illustrates a method 600 for content recommendation post-processing. According to various embodiments, the method 600 may be initiated when recommendations are transmitted for presentation at a client machine. For instance, numerical modeling may be performed periodically to produce content recommendations and generate viewing patterns, as discussed with respect to FIGS. 1 and 4. These recommendations may be provided to a viewer when the viewer accesses a content management interface for managing media content via a content management account. The viewer's actions with respect to the media content may be analyzed to provide updated content recommendations based on recent viewing activity. For example, specific recommendations may be provided based on indications of the geolocation of a user associated with a content playback device accessing the media system.

According to various embodiments, the method 600 may be initiated when viewing activity is detected at the client machine. For instance, recommendations may be sent to a viewer when the viewer begins using a content playback device. Then, when the viewer performs an action such as selecting content for presentation, rating content, or viewing a designated time period or percentage of a content item, the action may be compared with viewing profiles to determine an absolute or relative location of the viewer.

According to various embodiments, the method 600 may be performed at a media system, such as the systems discussed with respect to FIG. 2 and FIGS. 7-9. The method 600 may be performed in conjunction with a media content recommendation method, such as the method 100 discussed with respect to FIG. 1. For example, various operations discussed in FIG. 6 may act as elaborations or specific instances of operations discussed with respect to FIG. 1, such as operation 112. As another example, various operations discussed with respect to FIG. 6 may be performed in addition to, or instead of, operations discussed with respect to other Figures described herein.

At 602, recent viewing activity information is received for a content management account. According to various embodiments, the recent viewing activity may include viewing history and preference data collected recently, such as within the last hour or in the time period that has elapsed since the most recent iteration of the baseline numerical modeling.

According to various embodiments, the viewing history and preference data may include location information that indicates a viewer's location. For example, the location information may include GPS information collected from a mobile phone or other mobile computing device. As another example, the location information may include IP address information. For instance, the location information may identify an IP address that is associated with the user's home Internet connection, workplace Internet connection, or mobile computing device when used in a particular location.

In particular embodiments, the location information may be collected from other devices located near the viewer. For instance, the user may be accessing the media system from a tablet computer using a content management account. At the same time, the user may be carrying a mobile phone also associated with the content management account. Instead of, or in addition to, location information collected from the mobile computing device, location information may be collected from the mobile phone. The mobile phone may in some instances be capable of providing more accurate location information, such as GPS data. Then, the location of the nearby mobile computing device may be inferred based on the information provided by the mobile phone.

According to various embodiments, the viewing history and preference data may include any information that describes or characterizes the viewer's actions with respect to content management. For example, the viewing history and preference data may include one or more content ratings that are inferred based on viewer actions or that are expressly provided by the viewer. As another example, the data may include information indicating that the viewer has recently selected one or more content items for viewing. As yet another example, the data may indicate a time period or percentage of a content item that was presented to the viewer.

According to various embodiments, the recent viewing history and preference data may include information that has been generated based on recent viewer activity that has not yet been incorporated into numerical modeling and baseline content recommendation calculation. For instance, numerical modeling to perform baseline content recommendation may be performed relatively infrequently, such as once per day, once per hour, or twice per week. However, viewing history and preference data may be collected more frequently, such as whenever the viewer accesses the content management system. Providing conditional content recommendations based on this recent data may allow the recommendation to adapt more quickly to viewer actions, with up-to-date recommendations that reflect the viewer's recent and current viewing activities.

At 606, a determination is made as to whether the geographic context information matches the identified geographic viewing profile. According to various embodiments, the determination may be made by estimating the viewer's location based on the geographic context information and determining whether the location is within an area specified by the geographic viewing profile. For example, the geographic viewing profile may designate a relatively limited area, such as the area within and near a particular house, office building, store, or movie theatre. As another example, the profile may designate a relatively large area, such as anywhere within the viewer's home city. Such a profile may either include or exclude areas already included in other profiles, such as a profile associated with the viewer's home within that city. As yet another example, the profile may designate a distance from a reference point, such as designating any location located more than 50 miles from a viewer's home as a travel or vacation location.

In particular embodiments, two or more geographic viewing profiles may match the geographic context information. For example, a viewer may be both at home and in a more specific location, such as the kitchen. As another example, the viewer may be traveling between two nearby locations, each associated with a viewing profile. In such cases, one profile may be selected or a combination of profiles may be used. For instance, the media system may select the more specific profile or the destination profile if the viewer seems to be traveling.

According to various embodiments, techniques for determining the users' presence in a particular zone can involve an absolute location calculation, a relative location calculation, or some combination thereof. For instance, a relative location may be calculated based on a set of linear factors where the geolocation of a user is scaled relative to a respective zone displacement. For example, a user that has an established viewing pattern such as a "home" viewing pattern may be located either within the "home" location or near it. A scaling proximity may then be computed to reflect a nearness-to-home. As another example, points of interests such as sports stadiums, movie theaters, or vacation sites may be scaled as well. The combined scaling may be aggregated into a linearized set of offsets that may be used to boost, or prioritize, certain content.

In particular embodiments, techniques for determining the user's association with a particular geographic viewing profile may selected based on factors such as speed. For instance, due to the complexity of some examples of such computation techniques, complex scaling may be used in conjunction with faster algorithms such as simple zonal boundary crossing in geo-spatial coordinates to ensure that a timely recommendation is available. Then, the potentially more accurate algorithm may be given preference if the results can be computed within an allotted timeframe, such as within 2 or 3 seconds. However, a faster and potentially less accurate algorithm may be given preference if the potentially more accurate algorithm would likely exceed its allotted execution timeframe.

At 608, a determination is made as to whether to compare the geographic context information with another geographic viewing pattern associated with the content management account. As discussed with respect to FIG. 4, a content management account may be associated with some number of different geographic viewing profiles, which may be created based on past viewing activity or on other information regarding viewer preferences at different locations. Some or all of these profiles may be compared with the viewer's recent viewing activity to identify a matching profile.

In particular embodiments, the viewing activity may in some instances not match a geographic viewing profile associated with the content management account for any of a variety of reasons. For instance, a viewer may access the media system from a new location. In this case, the media system may perform any of a variety of operations to provide the viewer with content recommendations. For example, the media system may identify a partially matching geographic viewing profile, such as a geographic viewing profile associated with a nearby location. As another example, the media system may employ a default or "home" geographic viewing profile. As yet another example, the media system may compare the user's actions or content selections at the new location with past behavior to select an appropriate geographic viewing profile. As still another example, the media system may create a new geographic viewing profile for the content management account. In yet a different example, the media system may analyze geographic viewing profiles associated with other content management accounts to identify relevant content recommendations.

At 610, one or more content items to recommend for presentation are identified. According to various embodiments, a geographic viewing profile may be associated with content recommendations when the viewing profile is generated. For instance, numerical modeling performed as discussed with respect to FIGS. 1 and 4 may identify content items that a viewer associated with a particular content management account is likely to enjoy at a particular location. These content items may then be recommended to a viewer who accesses the media system from the location. Accordingly, the content items may be identified by retrieving recommendations from a storage system.

A recommended media content item associated with a geographic viewing profile may be any individual media object, media category or genre, or media channel capable of being analyzed by the recommendation system. For example, a media content item may be an individual piece of content such as a video object. As another example, a media content item may be a standardized content channel such as a television channel or a personalized content channel created by the media system. As yet another example, a media content item may be a content category such as a genre.

In particular embodiments, not all of the content items recommended need be based on the geographic viewing profile. In some cases, a viewer may be provided with other content recommendations for any of a variety of reasons. For example, the recommendation engine may have incorrectly identified a viewer's geographic viewing profile. As another example, the viewer may be provided with other recommendations in case the viewer's location or preferences change. For instance, a user initially may be viewing content on a mobile device at home and then may continue to view content while traveling away from home. As yet another example, a viewer exhibiting a particular viewing pattern may be provided with recommendations from the baseline recommendation set associated with a content management account as well as with recommendations associated with the viewer's current geographic context. For instance, a viewer accessing the media system from home may be primarily interested in watching long-form content such as television programs and movies. However, the viewer may also be interested in viewing some short-form content such as timely news clips.

At 612, the identified content recommendations are provided. According to various embodiments, providing the content recommendation may involve transmitting the content recommendation to a client machine for presentation in a user interface. For instance, a user interface at a client machine may be configured to allow a user to view, select, search, and otherwise manage content items. The content recommendations presented in the interface may be updated based on the operations discussed with respect to FIG. 6. In this way, the viewer may be provided with up-to-date content recommendations based on recent viewing history and preference data, such as data received within the last hour or day, that may not have been fully incorporated into the latest round of numerical modeling.

According to various embodiments, the operations related to post-processing content recommendation data may be performed in an order different than that shown in FIG. 6. For example, instead of analyzing viewing patterns until a match is determined, viewing activity may be compared with potentially many different geographic profiles to determine the best match. For instance, information indicative of a user's location may be compared with each geographic viewing profile associated with a content management account.

Figure 7:
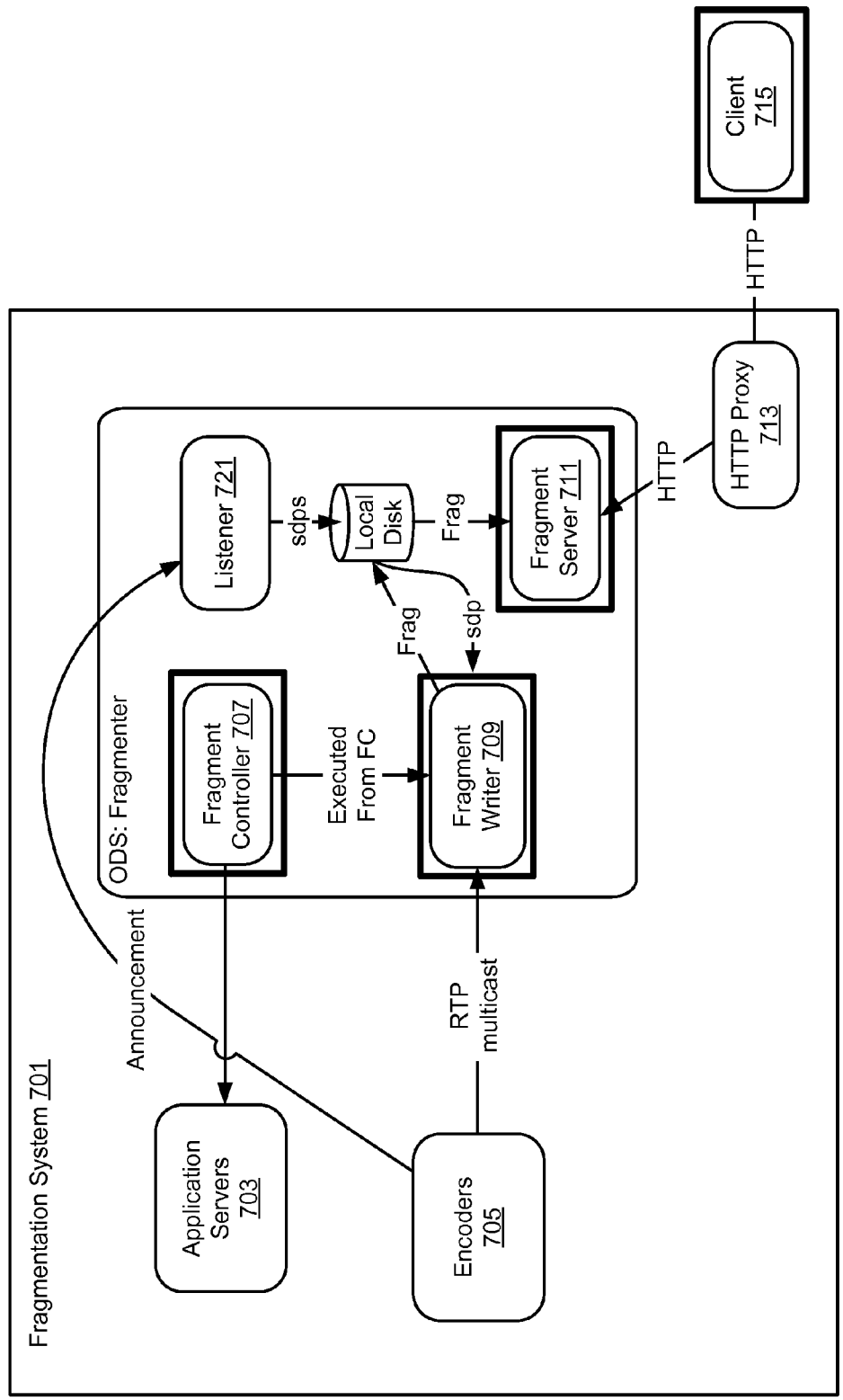
FIGS. 7-9 illustrate examples of systems.

FIG. 7 is a diagrammatic representation illustrating one example of a fragment or segment system 701 associated with a content server that may be used in a broadcast and unicast distribution network. Encoders 705 receive media data from satellite, content libraries, and other content sources and sends RTP multicast data to fragment writer 709. The encoders 705 also send session announcement protocol (SAP) announcements to SAP listener 721. According to various embodiments, the fragment writer 709 creates fragments for live streaming, and writes files to disk for recording. The fragment writer 709 receives RTP multicast streams from the encoders 705 and parses the streams to repackage the audio/video data as part of fragmented MPEG-4 files. When a new program starts, the fragment writer 709 creates a new MPEG-4 file on fragment storage and appends fragments. In particular embodiments, the fragment writer 709 supports live and/or DVR configurations.

The fragment server 711 provides the caching layer with fragments for clients. The design philosophy behind the client/server application programming interface (API) minimizes round trips and reduces complexity as much as possible when it comes to delivery of the media data to the client 715. The fragment server 711 provides live streams and/or DVR configurations.

The fragment controller 707 is connected to application servers 703 and controls the fragmentation of live channel streams. The fragmentation controller 707 optionally integrates guide data to drive the recordings for a global/network DVR. In particular embodiments, the fragment controller 707 embeds logic around the recording to simplify the fragment writer 709 component. According to various embodiments, the fragment controller 707 will run on the same host as the fragment writer 709. In particular embodiments, the fragment controller 707 instantiates instances of the fragment writer 709 and manages high availability.

According to various embodiments, the client 715 uses a media component that requests fragmented MPEG-4 files, allows trick-play, and manages bandwidth adaptation. The client communicates with the application services associated with HTTP proxy 713 to get guides and present the user with the recorded content available.

Figure 8:
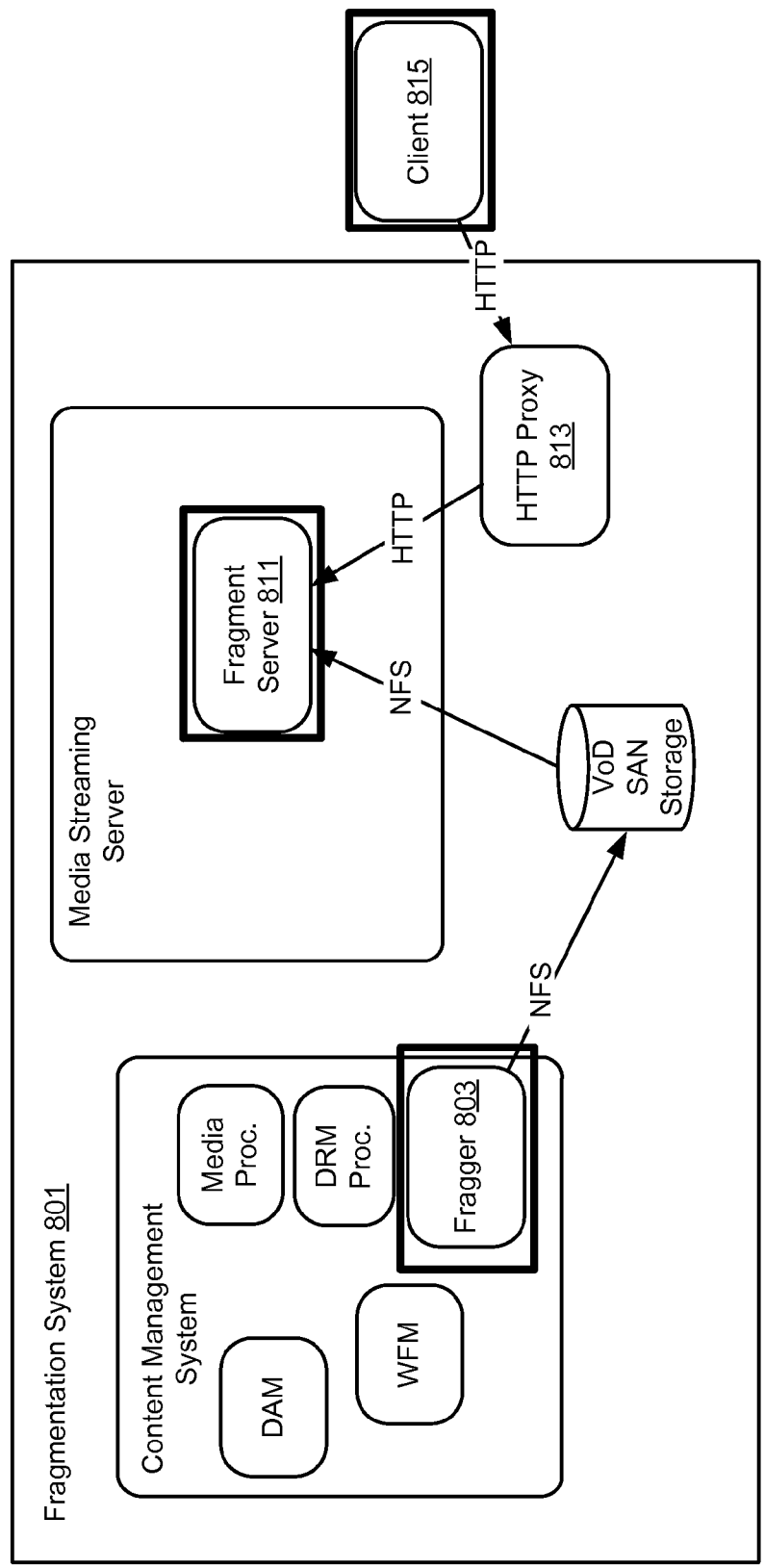

FIG. 8 illustrates one example of a fragmentation system 801 that can be used for video-on-demand (VoD) content. Fragger 803 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 811 provides the caching layer with fragments for clients. The design philosophy behind the client/server API minimizes round trips and reduces complexity as much as possible when it comes to delivery of the media data to the client 815. The fragment server 811 provides VoD content.

According to various embodiments, the client 815 uses a media component that requests fragmented MPEG-4 files, allows trick-play, and manages bandwidth adaptation. The client communicates with the application services associated with HTTP proxy 813 to get guides and present the user with the recorded content available.

Figure 9:
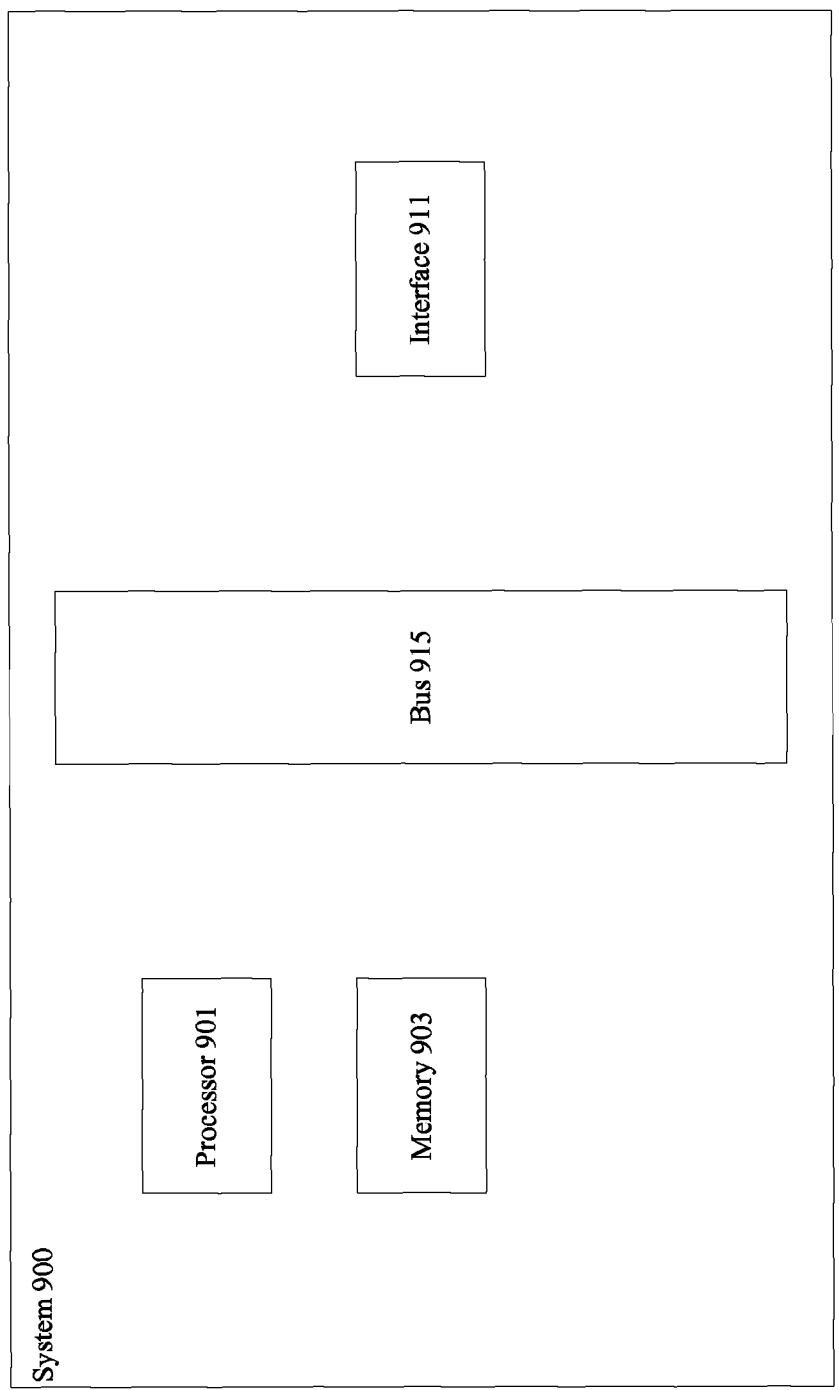

FIG. 9 illustrates one example of a server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:

creating a geographic viewing profile associated with a designated one of a plurality of content management accounts at a media system by numerically modeling input data and identifying a pattern of viewing activity based on the input data, the designated content management account providing access to a plurality of media content items via the media system, the input data comprising a plurality of data points describing the presentation of a plurality of presented media content items in association with the plurality of content management accounts, each data point identifying a respective location associated with the presentation of a respective one of the presented media content items in association with a respective one of the content management accounts, the geographic viewing profile designating one or more of the plurality of media content items for recommendation in association with the designated content management account and designating a geographic context for recommending the designated media content items, the pattern of viewing activity reflecting the presentation of selected ones of the presented media content items at the geographic context designated by the geographic viewing profile;

receiving information identifying one or more viewing events or actions detected in association with the designated content management account, the one or more viewing events or actions having associated therewith location information indicating a location at which the one or more viewing events or actions occurred; and when the location information matches the designated geographic context, transmitting a message to a client machine associated with the designated content management account, the message comprising an instruction for recommending the designated media content items for presentation.

2. The method recited in claim 1, wherein creating the geographic viewing profile further comprises:

selecting the designated media content items to match the pattern of viewing activity.

3. The method recited in claim 2, wherein creating the geographic viewing profile further comprises:

identifying a plurality of geographic locations associated with the presentation of the plurality of presented media content items, and identifying a relationship between the identified geographic locations.

4. The method recited in claim 1, wherein each of the designated media content items is associated with a respective estimate of a preference for the designated media content item, the estimate of the preference being associated with the designated content management account.

5. The method recited in claim 1, wherein the location information includes data selected from the group consisting of: global position system information data, IP address information, and mobile phone tower positioning data.

6. The method recited in claim 1, wherein the designated media content item is an item selected from the group consisting of: a video object, a media content genre, a media content category, and a media content channel.

7. A system comprising:
   a processor operable to create a geographic viewing profile associated with a designated one of a plurality of content management accounts at a media system by numerically modeling input data and identifying a pattern of viewing activity based on the input data, the designated content management account providing access to a plurality of media content items via the media system, the input data comprising a plurality of data points describing the presentation of a plurality of presented media content items in association with the plurality of content management accounts, each data point identifying a respective location associated with the presentation of a respective one of the presented media content items in association with a respective one of the content management accounts, the geographic viewing profile designating one or more of the plurality of media content items for recommendation in association with the designated content management account and designating a geographic context for recommending the designated media content items, the pattern of viewing activity reflecting the presentation of selected ones of the presented media content items at the geographic context designated by the geographic viewing profile;
   a storage system operable to store information identifying one or more viewing events or actions detected in association with the designated content management account, the one or more viewing events or actions having associated therewith location information indicating a location at which the one or more viewing events or actions occurred; and
   a network interface operable to transmit a message to a client machine associated with the designated content management account when the location information matches the designated geographic context, the message comprising an instruction for recommending the designated media content items for presentation.

8. The system recited in claim 7, wherein creating the geographic viewing profile comprises:
   selecting the designated media content items to match the pattern of viewing activity.

9. The system recited in claim 8, wherein creating the geographic viewing profile comprises:
   identifying a plurality of geographic locations associated with the presentation of the plurality of presented media content items, and
   identifying a relationship between the identified geographic locations.

10. The system recited in claim 7, wherein each of the designated media content items is associated with a respective estimate of a preference for the designated media content item, the estimate of the preference being associated with the designated content management account.

11. The system recited in claim 7, wherein the location information includes data selected from the group consisting of: global position system information data, IP address information, and mobile phone tower positioning data.

12. The system recited in claim 7, wherein the designated media content item is an item selected from the group consisting of: a video object, a media content genre, a media content category, and a media content channel.

13. One or more non-transitory computer readable media having instructions stored thereon for performing a method, the method comprising:
   creating a geographic viewing profile associated with a designated one of a plurality of content management accounts at a media system by numerically modeling input data and identifying a pattern of viewing activity based on the input data, the designated content management account providing access to a plurality of media content items via the media system, the input data comprising a plurality of data points describing the presentation of a plurality of presented media content items in association with the plurality of content management accounts, each data point identifying a respective location associated with the presentation of a respective one of the presented media content items in association with a respective one of the content management accounts, the geographic viewing profile designating one or more of the plurality of media content items for recommendation in association with the designated content management account and designating a geographic context for recommending the designated media content items, the pattern of viewing activity reflecting the presentation of selected ones of the presented media content items at the geographic context designated by the geographic viewing profile;
   receiving information identifying one or more viewing events or actions detected in association with the designated content management account, the one or more viewing events or actions having associated therewith location information indicating a location at which the one or more viewing events or actions occurred; and
   when the location information matches the designated geographic context, transmitting a message to a client machine associated with the designated content management account, the message comprising an instruction for recommending the designated media content items for presentation.

14. The one or more computer readable media recited in claim 13, wherein creating the geographic viewing profile further comprises:
   selecting the designated media content items to match the pattern of viewing activity.

15. The one or more computer readable media recited in claim 14, wherein creating the geographic viewing profile further comprises:
   identifying a plurality of geographic locations associated with the presentation of the plurality of presented media content items, and
   identifying a relationship between the identified geographic locations.

16. The one or more computer readable media recited in claim 13, wherein each of the designated media content items is associated with a respective estimate of a preference for the designated media content item, the estimate of the preference being associated with the designated content management account.

17. The one or more computer readable media recited in claim 13, wherein the location information includes data selected from the group consisting of: global position system information data, IP address information, and mobile phone tower positioning data.

18. The one or more computer readable media recited in claim 13, wherein the designated media content item is an item selected from the group consisting of: a video object, a media content genre, a media content category, and a media content channel.

* * * * *